United States Patent
Hagenbuch et al.

(10) Patent No.: US 10,439,380 B2
(45) Date of Patent: Oct. 8, 2019

(54) RECEPTACLE BOX AND METHOD OF INSTALLING SAME

(71) Applicant: ATAS International, Inc., Allentown, PA (US)

(72) Inventors: Chad Michael Hagenbuch, Mesa, AZ (US); Theodorus Antonius Bus, Orefield, PA (US)

(73) Assignee: ATAS International, Inc., Allentown, PA (US)

( * ) Notice: Subject to any disclaimer, the term of this patent is extended or adjusted under 35 U.S.C. 154(b) by 0 days.

(21) Appl. No.: 15/313,589

(22) PCT Filed: Jun. 5, 2015

(86) PCT No.: PCT/US2015/034475
§ 371 (c)(1),
(2) Date: Nov. 23, 2016

(87) PCT Pub. No.: WO2015/188097
PCT Pub. Date: Dec. 10, 2015

(65) Prior Publication Data
US 2017/0194778 A1 Jul. 6, 2017

Related U.S. Application Data

(60) Provisional application No. 62/008,005, filed on Jun. 5, 2014.

(51) Int. Cl.
*H02G 3/18* (2006.01)
*H02G 3/12* (2006.01)
*H02G 3/08* (2006.01)
*H02G 3/14* (2006.01)
*H02G 1/00* (2006.01)

(52) U.S. Cl.
CPC .............. *H02G 3/18* (2013.01); *H02G 3/081* (2013.01); *H02G 3/12* (2013.01); *H02G 3/123* (2013.01); *H02G 3/14* (2013.01); *H02G 1/00* (2013.01)

(58) Field of Classification Search
CPC ........................................................ H02G 3/14
See application file for complete search history.

(56) References Cited

U.S. PATENT DOCUMENTS

| | | | | |
|---|---|---|---|---|
| 7,005,578 B2 * | 2/2006 | Gretz | ..................... | H02G 3/123 174/50 |
| 7,319,192 B1 | 1/2008 | Gretz | | |
| 7,816,604 B1 * | 10/2010 | Gretz | ................... | H01R 25/006 174/135 |
| 8,299,358 B2 * | 10/2012 | Huang | ..................... | H02G 3/14 174/66 |
| 2003/0102308 A1 | 6/2003 | Sullivan | | |
| 2004/0188126 A1 | 9/2004 | Grendahl | | |

(Continued)

FOREIGN PATENT DOCUMENTS

JP 2007143322 A 6/2007

OTHER PUBLICATIONS

Korean International Search Report and Written Opinion of the International Searching Authority, dated Sep. 17, 2015, for PCT/US15/34475.

*Primary Examiner* — Babajide A Demuren
(74) *Attorney, Agent, or Firm* — Design IP

(57) ABSTRACT

The present application teaches a receptacle box and methods of installing same for use in new and existing home and building construction.

18 Claims, 15 Drawing Sheets

(56) References Cited

U.S. PATENT DOCUMENTS

| | | | |
|---|---|---|---|
| 2008/0179071 A1 | 7/2008 | Jolly | |
| 2012/0279148 A1* | 11/2012 | Gagne | H02G 3/121 52/173.1 |
| 2013/0036703 A1* | 2/2013 | Gagne | H02G 3/36 52/656.2 |
| 2015/0214707 A1* | 7/2015 | Shotey | H02G 3/14 174/66 |
| 2017/0288350 A1* | 10/2017 | Andersen | H02G 3/14 |
| 2017/0365990 A1* | 12/2017 | Shotey | H02G 3/14 |

* cited by examiner

FIG. 5A  FIG. 5B

RECEPTACLE BOX AND METHOD OF INSTALLING SAME

FIELD OF THE INVENTION

The present invention relates to receptacle boxes for construction of structures, and more particularly to receptacle boxes for the exterior of structures.

BACKGROUND

Exterior outlet receptacle boxes are commonly installed on the exterior surface of the sheathing of a structure before the building panels (e.g., metal wall panels or vinyl siding) are installed on the structure and run up to and in contact with the receptacle boxes. This often requires extensive preparation when planning the building panel layout, because multiple panels often need to be cut before installation onto the structure in order to accommodate the locations of the receptacle boxes.

Accordingly, there is a need for a receptacle box and method of installing same that are improvements over existing devices and methods.

BRIEF DESCRIPTION OF THE DRAWINGS

The receptacle box according to the present invention is further described with reference to the accompanying drawings, in which:

FIG. 5A is a front perspective view thereof;

FIG. 5B is a side view thereof;

DETAILED DESCRIPTION OF THE PREFERRED EMBODIMENTS

Figure 1A:
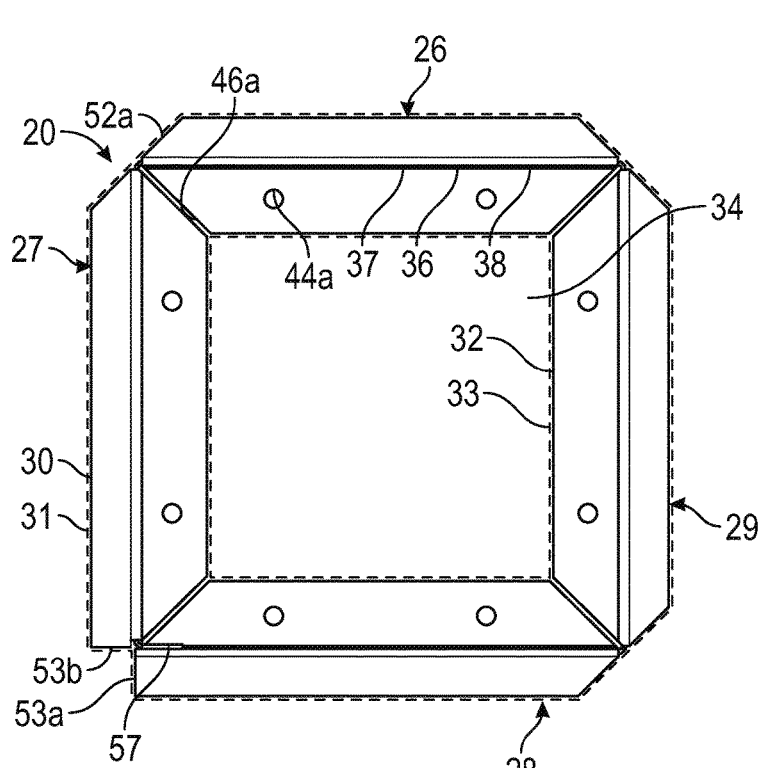
FIG. 1A is a front view of a box portion of an outlet box in accordance with the present invention.

The ensuing detailed description provides preferred exemplary embodiments only, and is not intended to limit the scope, applicability, or configuration of the herein disclosed inventions. Rather, the ensuing detailed description of the preferred exemplary embodiments will provide those skilled in the art with an enabling description for implementing the preferred exemplary embodiments in accordance with the herein disclosed invention. It should be understood that various changes may be made in the function and arrangement of elements without departing from the spirit and scope of the invention, as set forth in the appended claims.

To aid in describing the invention, directional terms may be used in the specification and claims to describe portions of the present invention (e.g., upper, lower, left, right, etc.). These directional definitions are merely intended to assist in describing and claiming the invention and are not intended to limit the invention in any way. In addition, reference numerals that are introduced in the specification in association with a drawing figure may be repeated in one or more subsequent figures without additional description in the specification, in order to provide context for other features.

For purposes of the specification and claims, two parts, components, assemblies, lines, surfaces, or planes are considered to be "substantially parallel" to another when an absolute value of the measurement of the angle between the two parts, components, assemblies, lines, surfaces, or planes does not exceed 10 degrees.

Figure 7:
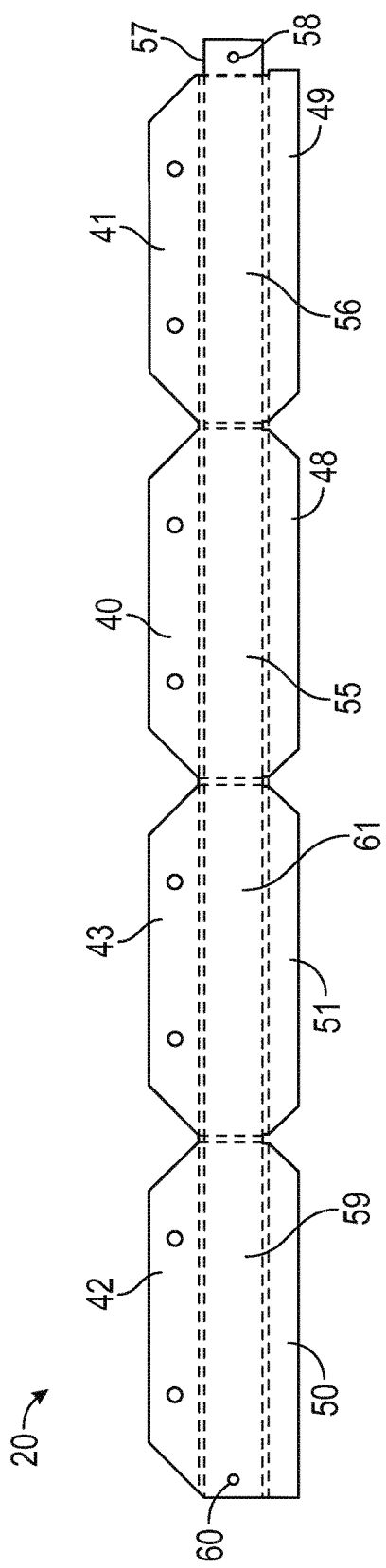
FIG. 7 is a front view of the box portion of FIGS. 1A-1C, before being folded into the configuration shown in FIGS. 1A-1C.

FIGS. 1A-1C and 7 show various views of a box portion 20 of an embodiment of an outlet box 10 (see FIG. 4) according to the present invention. As best seen in FIG. 7, in this embodiment the box portion 20 is made from a single piece of material (e.g., aluminum, steel, or other metal), which is folded where illustrated by broken lines in FIG. 7 to form the box portion 20 shown in FIGS. 1A-1C. In alternate embodiments, the box portion 20 may be made of more than one piece of material.

In this embodiment, the box portion 20 has a front side 24 and a rear side 25 that define a depth 22 of the box portion 20. The box portion 20 has a top edge 26, a side edge 27, a bottom edge 28, a side edge 29, six exterior angled corner edges (for convenience, only exterior angled corner edge 52a is labeled in the Figures), and a pair of exterior straight corner edges 53a,53b that collectively form an exterior perimeter 30 of the box portion 20. The exterior perimeter 30 of the box portion 20 defines the boundaries of a two-dimensional exterior area 31 of the box portion 20, The top edge 26 and a first pair of the exterior angled corner edges (including exterior angled corner edge 52a) are parts of an exterior top flange 48. The side edge 29 and a second pair of exterior angled corner edges are parts of an exterior side flange 51. The bottom edge 28, an exterior angled corner edge, and the exterior straight corner edge 53a are parts of the exterior bottom flange 50. The side edge 27, an exterior angled corner edge, and the exterior straight corner edge 53b are parts of the exterior side flange 49. In an alternate embodiment, the exterior straight corner edges 53a,53b could be made angled like the exterior angled corner edges.

Figure 1B:
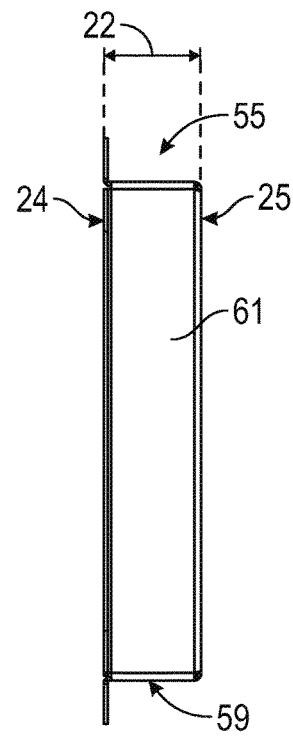
FIG. 1B is a side view thereof.
Figure 1C:
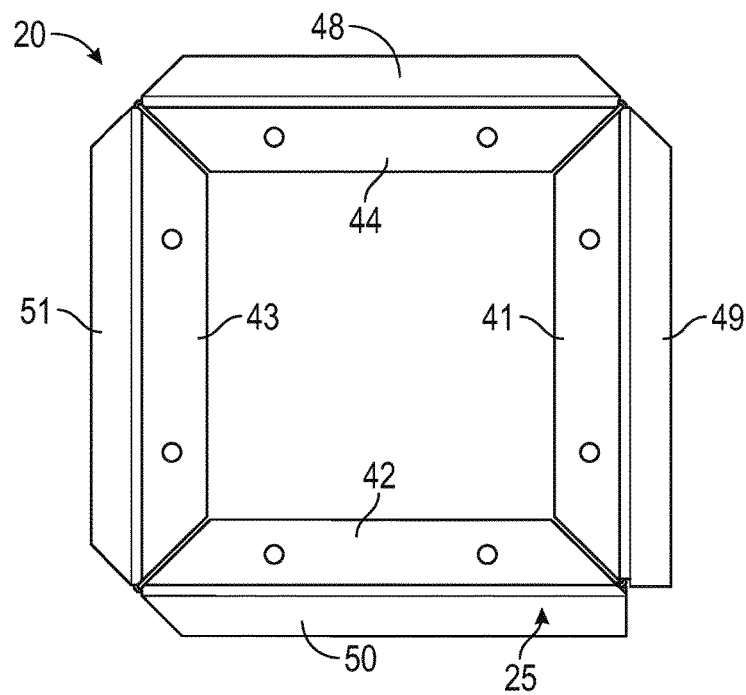
FIG. 1C is a rear view thereof.
Figure 14:
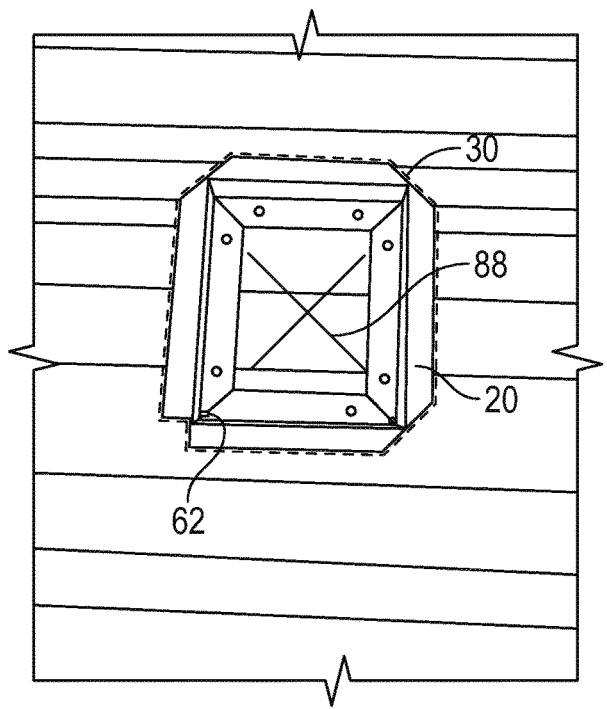
Figure 15:
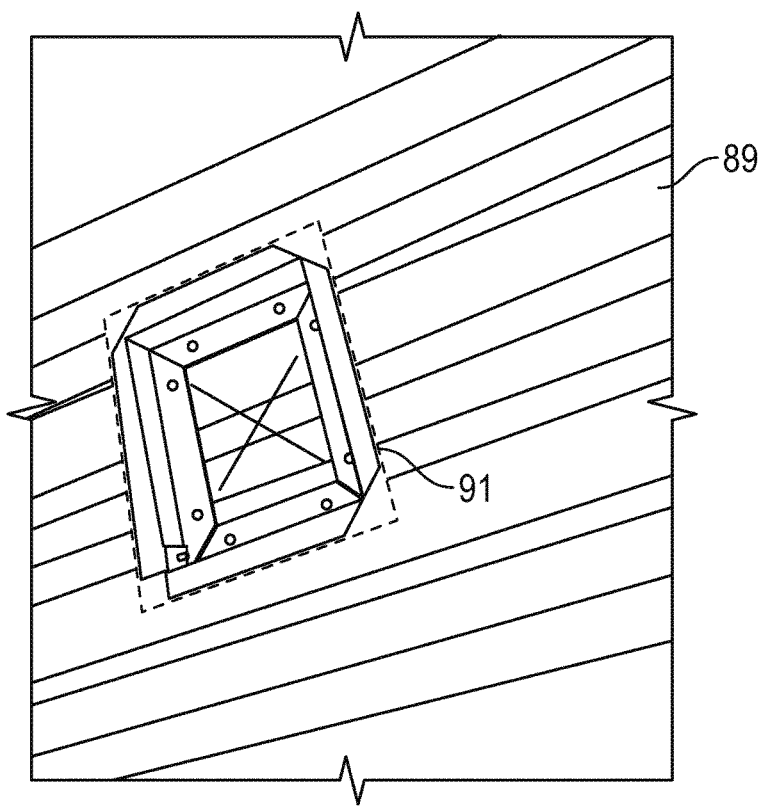

The box portion 20 further comprises a top panel 55, a side panel 56, a bottom panel 59, a side panel 61, and an assembly flange 57 attached to the side panel 56. The assembly flange 57 has an assembly fastener hole 58 therein and the bottom panel 59 has an assembly fastener hole 60 therein. When the box portion 20 is folded as shown in FIGS. 1A-1C, an assembly fastener 62 (see FIG. 14) is routed through the assembly fastener holes 58,60 in order to hold the box portion 20 together. In alternate embodiments, the assembly flange may be provided with a bendable tab or other piece that may fit within a slot or other appropriately shaped receptacle located on or in the bottom panel 59, so that the box portion 20 may be formed from a single piece of material and held integrally together without the use of any additional parts.

The front edges of the top panel 55, side panel 56, bottom panel 59, and side panel 61 define a box portion front opening 36. Ignoring the extreme corners of these panels

55,56,59,61 (i.e., where the panels transition from one side to the next and small gaps are present at the corners), the box portion front opening 36 defines a box portion front opening perimeter 37 that in this embodiment is approximately a square, though in alternate embodiments may be rectangular, triangular, circular, or an irregular shape. The box portion front opening perimeter 37 defines the boundaries of a two-dimensional box portion front opening area 38. Interior to the box portion front opening 36 are four interior flanges, interior top flange 40, interior side flange 41, interior bottom flange 42, and interior side flange 43. Each of the interior flanges 40-43 has a pair of interior angled corner edges (for convenience, only interior angled corner edge 46a of interior top flange 40 is labeled in the Figures) and a pair of mounting holes routed therethrough (for convenience, only mounting hole 44a is labeled in the Figures). As will be described below in further detail, the mounting holes located on the interior flanges 40-43 receive fasteners for securing the box portion 20 to a structural surface (e.g., a. wall, roof, or floor of a structure). In alternate embodiments best suited for new construction applications, the interior flanges could extend away from (i.e., be located exterior to) the perimeter of the interior opening 32 located at the rear side of the box portion 20.

The interior flanges 40-43 collectively define an interior opening 32 of the box portion 20. Ignoring the extreme corners of the interior flanges 40-43 (i.e., where the interior angled corner edges come together to form each corner, and small gaps are present), the interior opening 32 defines an interior opening perimeter 33 that in this embodiment is approximately a square, though in alternate embodiments may be rectangular, triangular, circular, or an irregular shape. The interior opening perimeter 33 defines the boundaries of a two-dimensional interior opening area 34.

In this embodiment, the interior opening area 34 is smaller than the box portion front opening area 38, which is smaller than the exterior area 31 of the box portion 20. Other relationships between the magnitudes of these areas 31,34, 38 are possible within the scope of the present invention.

Figure 2A:
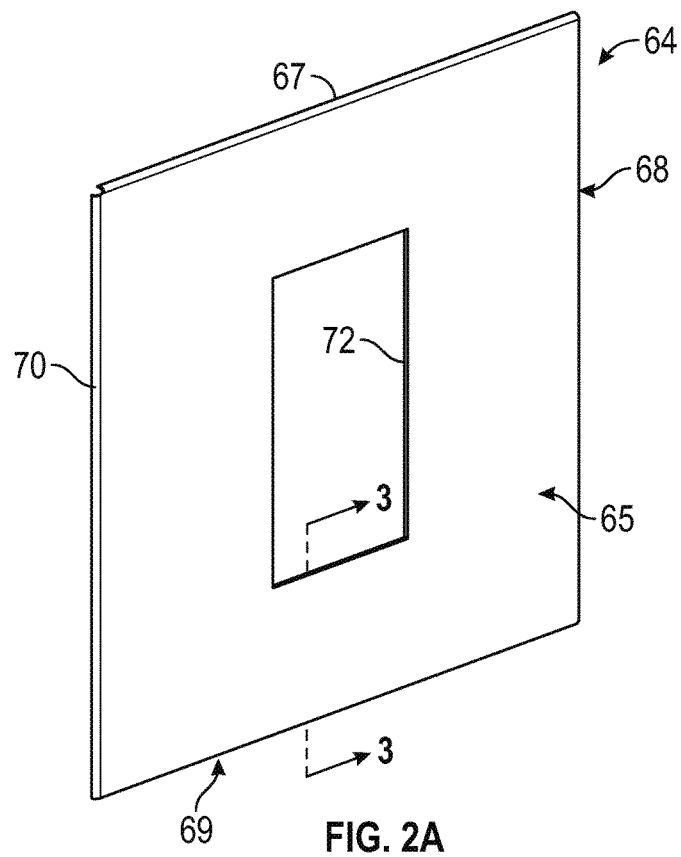
FIG. 2A is a front perspective view of a cover portion of the outlet box in accordance with the present invention.
Figure 2B:
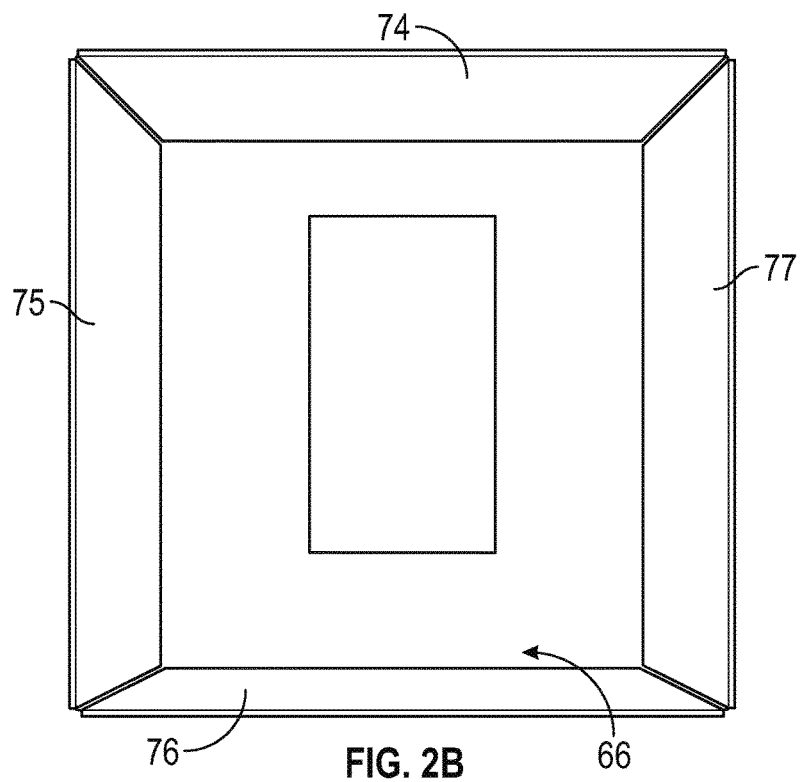
FIG. 2B is a rear view thereof.
Figure 8:
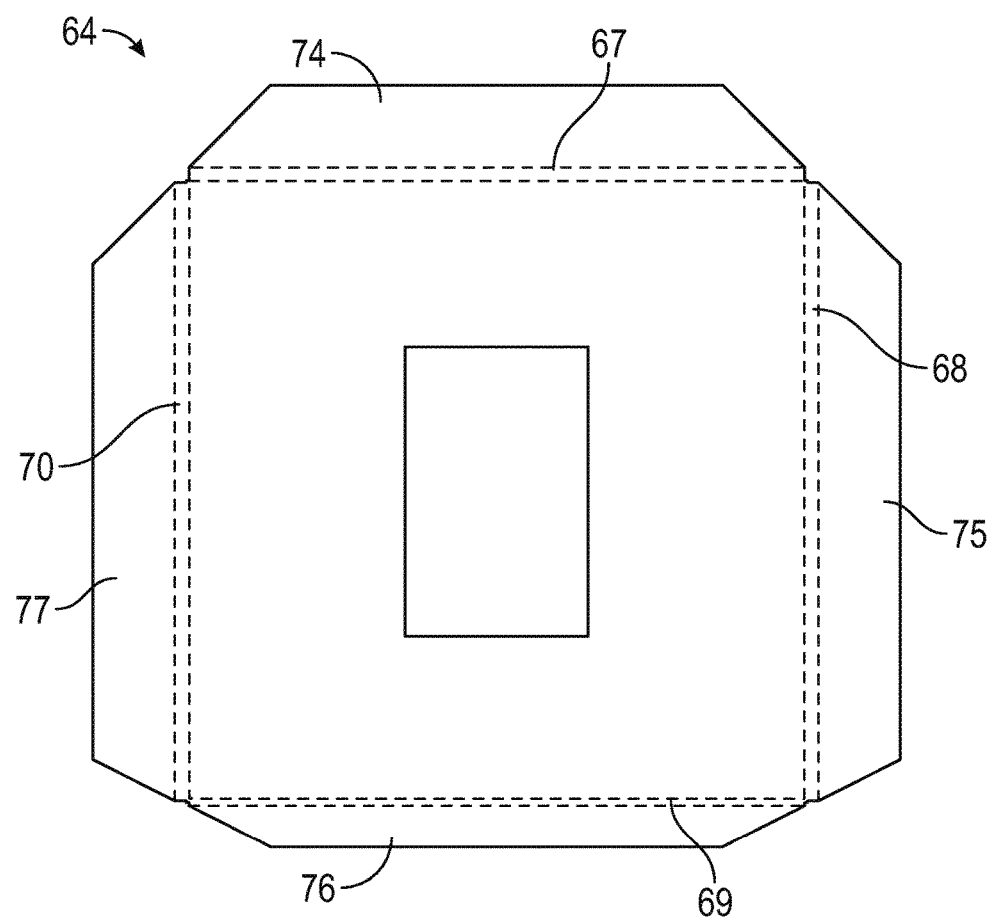
FIG. 8 is a front view of the cover portion of FIGS. 2A and 2B, before being folded into the configuration shown in FIGS. 2A and 2B.

FIGS. 2A, 2B, and 8 show various views of a cover portion 64 of the present embodiment of the outlet box 10 according to the present invention. As best seen in FIG. 8, in this embodiment the cover portion 64 is made from a single piece of material (e.g., aluminum or other metal), which is folded where illustrated by broken lines in FIG. 8 to form the cover portion 64 shown in FIGS. 2A and 2B. In alternate embodiments, the cover portion 64 may be made of more than one piece of material.

In this embodiment, the cover portion 64 has a front side 65 and a rear side 66 that define a depth 71 of the cover portion 64. The cover portion 64 has a top edge 67, a side edge 68, a bottom edge 69, and a side edge 70 that collectively form an exterior perimeter of the cover portion 64. The cover portion 64 further includes a outlet cover opening 72, which in this embodiment is sized and shaped to accommodate the attachment of a standard outlet cover 2 thereto (see FIG. 4). As seen in FIG. 2B, the cover portion 64 comprises a top flange 74, a side flange 75, a bottom flange 76, and a side flange 77.

Figure 3:
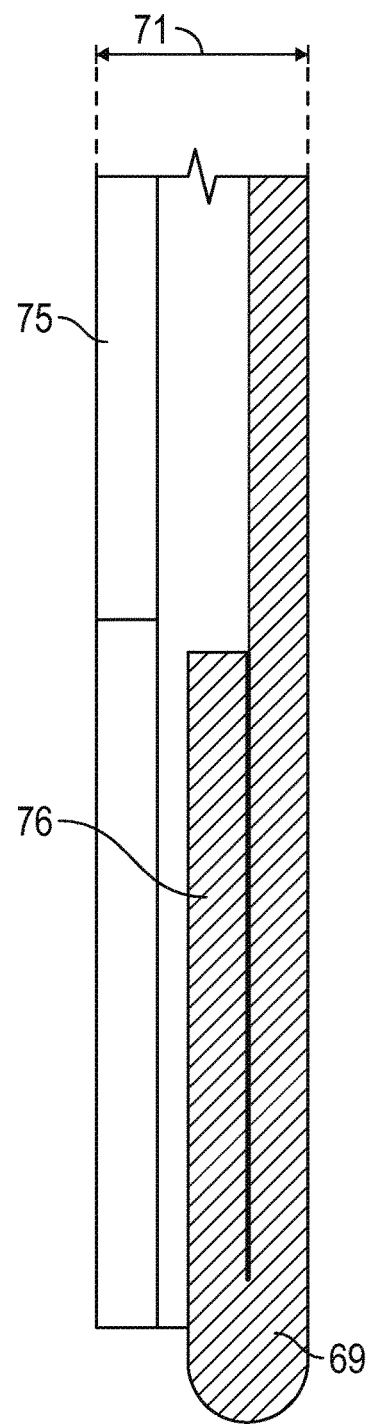
FIG. 3 is a sectional view taken along line 3-3 of FIG. 2A.
Figure 4:
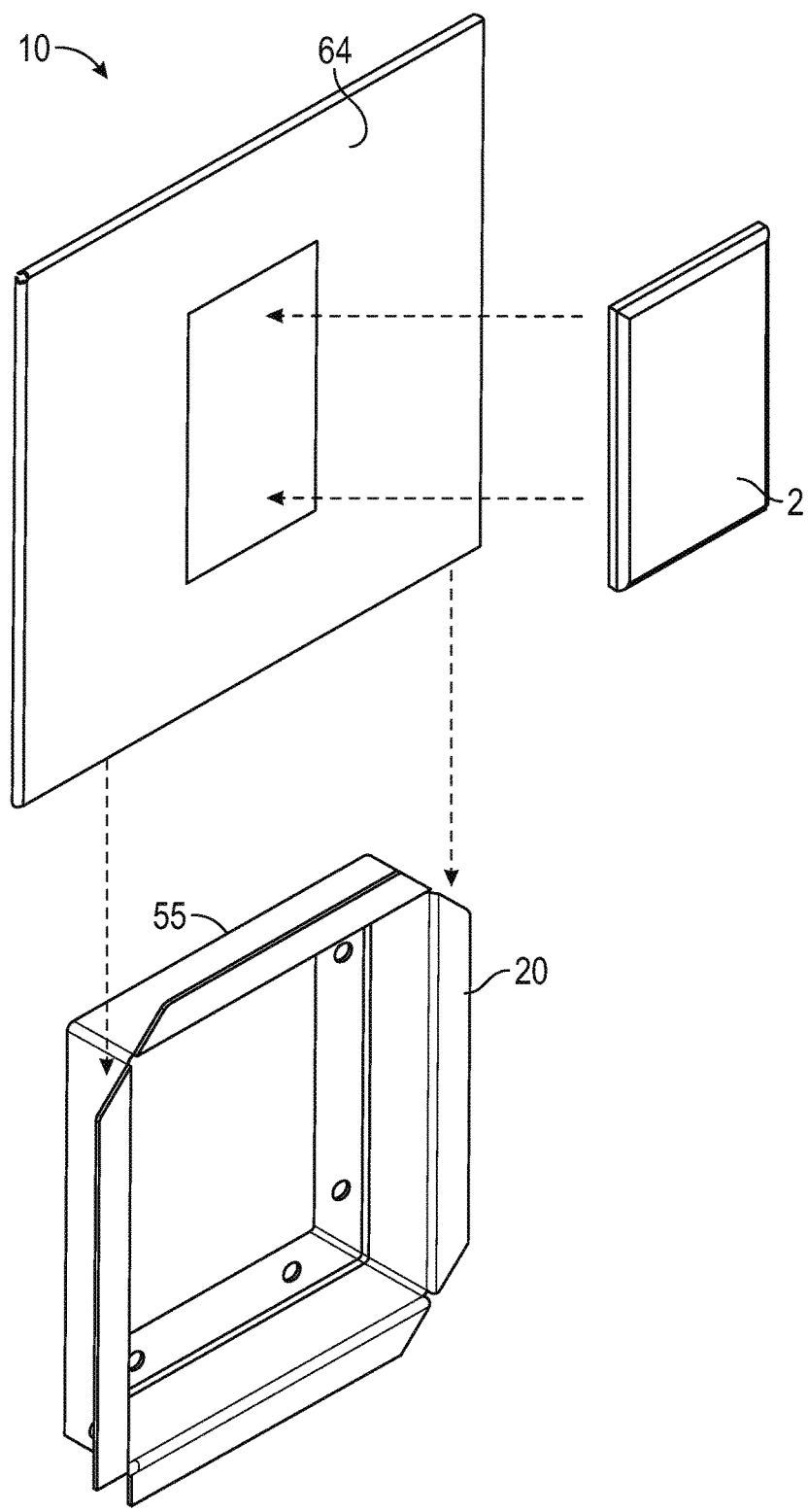
FIG. 4 is an exploded view of the outlet box in accordance with the present invention.
Figure 5C:
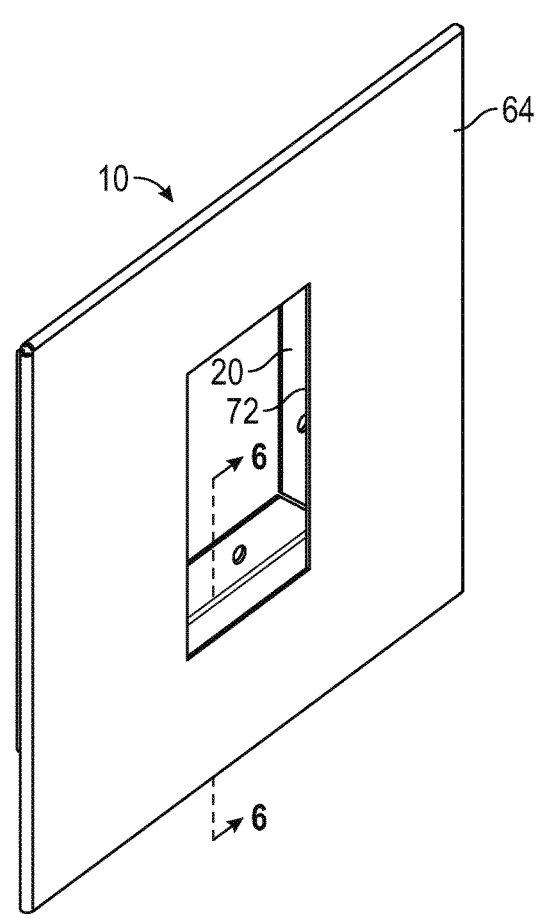
FIG. 5C is a bottom view thereof.
Figure 5C:
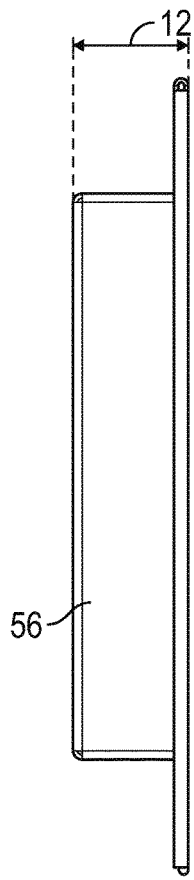
Figure 5C:
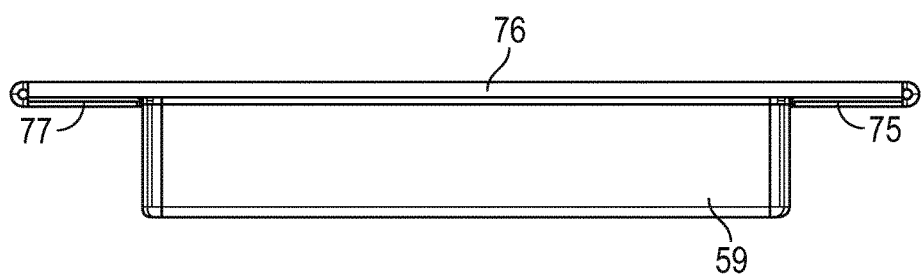
Figure 6:
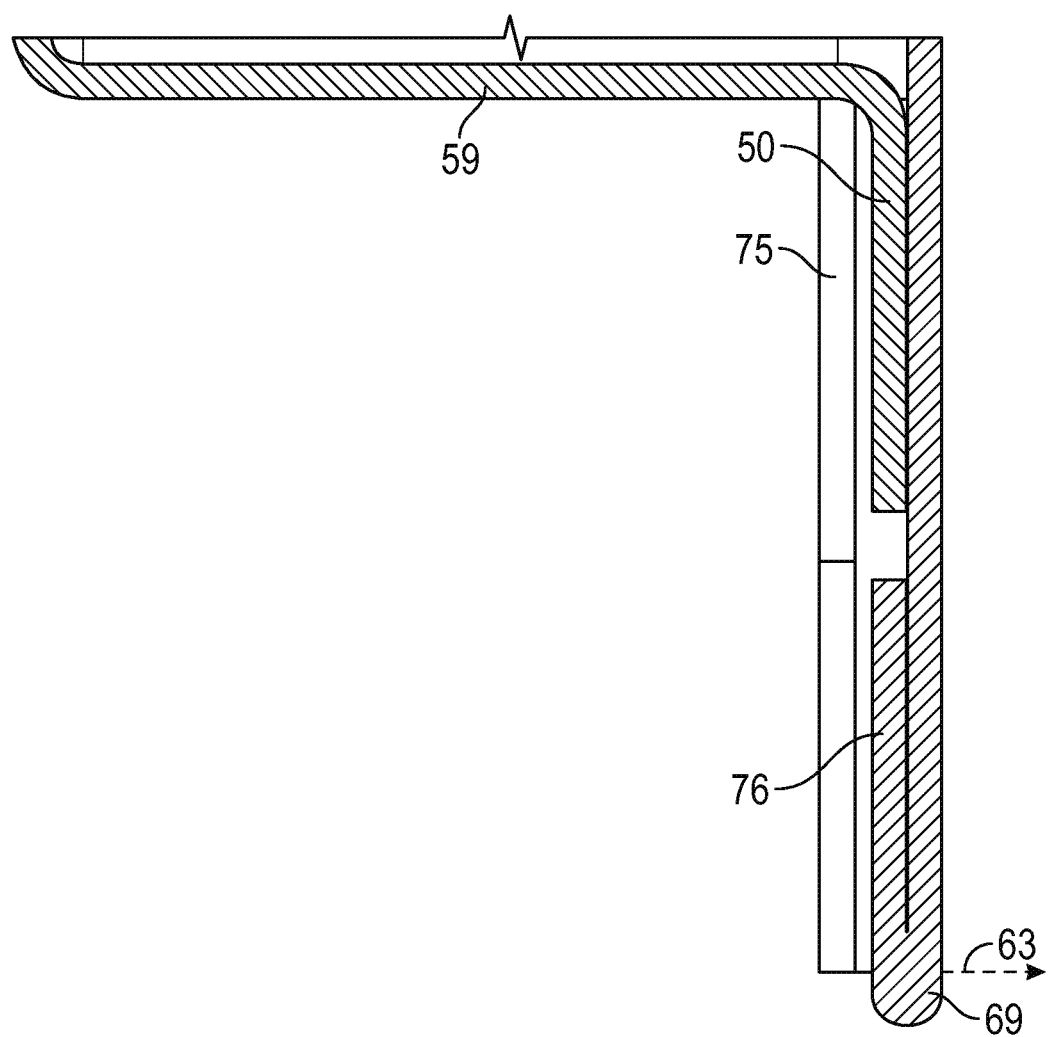
FIG. 6 is a sectional view taken along line 6-6 of FIG. 5A.

As seen in FIGS. 4-6, the outlet box 10 is assembled by sliding the cover portion 64 over the exterior flanges 48-51 of the box portion 20 so that the cover portion 64 covers the box portion front opening 36 (with the exception of the outlet cover opening 72 located in the cover portion 64). The top flange 74 and side flanges 75,77 of the cover portion 64 are bent such that some space is left between each respective flange and the remainder of the cover portion 64 such that the respective exterior flange (i.e., exterior flanges 48,49,51) of the box portion 20 can be accommodated therein, As seen in the sectional views of FIGS. 3 and 6, the bottom flange 76 of the cover portion is bent so that it is flattened directly against the remainder of the cover portion 64. In this way, once installed on the box portion 20, the cover portion 64 is unlikely to be accidentally knocked loose from the box portion 20, and may only be uninstalled from the box portion 20 by simultaneously moving the cover portion 64 in a removal direction 63 (i.e., in a direction that is substantially away from the front side 24 of the box portion 20) and upwardly (i.e., in a direction that is substantially towards the top panel 55 of the box portion 20). Only by moving the cover portion 64 in the removal direction 63 will the bottom flange 76 be relocated such that it is not located directly below the exterior bottom flange 50 of the box portion 20, thus permitting the cover portion 64 to then be removed from the box portion 20 by sliding the cover portion 64 upwardly.

As shown in FIG. 5B, the outlet box 10 has a depth 12 measured between the front side 65 of the cover portion 64 and the rear side 25 of the box portion 20. In this embodiment, the magnitude of the depth 12 of the outlet box 10 is less than the sum of the magnitudes of the depth 22 of the box portion 20 and the depth 71 of the cover portion 64. In alternate embodiments, these magnitudes may be equal.

Figure 9:
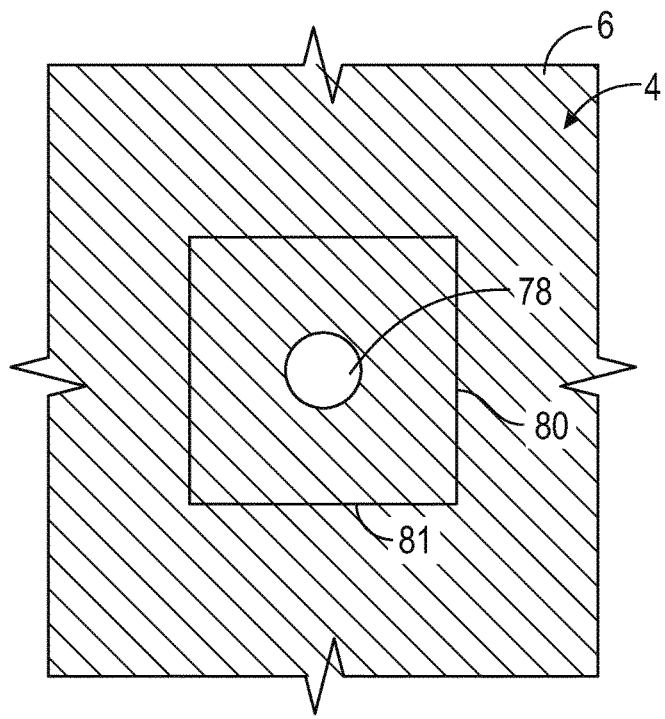
FIGS. 9-21 are views of various steps of a method of installing the outlet box on a structure in accordance with the present invention.

FIGS. 9-21 illustrate various steps of performing a method of installing the outlet box 10 in accordance with the present invention on an existing structure. FIG. 9 shows a structure 4, which is comprised of wall sheathing 6 (e.g., plywood wall sheathing). Prior to the step shown in FIG. 9, the User will have determined where an object (e.g., a wire, conduit, or pipe) should penetrate from the interior to the exterior of the structure, and drilled or cut an appropriate object throughhole 78 in the structure 4. In this embodiment, the object throughhole 78 is a round hole for passage of an electrical wire therethrough.

In the step shown in FIG. 9, the user holds the box portion 20 of an outlet box 10 over the object throughhole 78, approximately centers the object throughhole 78 within the interior opening area 34, and then creates an approximate outlet box marking 80 on the wall sheathing 6. The perimeter 81 of the approximate outlet box marking 80 will roughly correspond with the box portion front opening perimeter 37.

Figure 10:
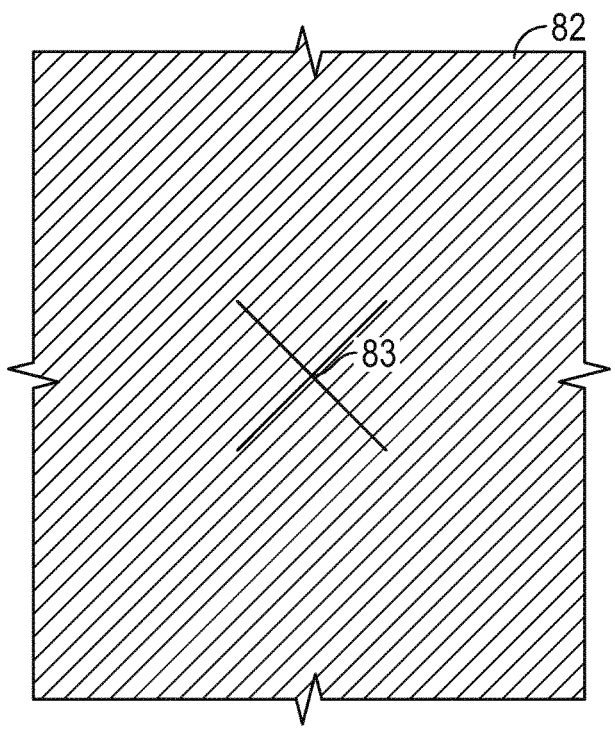

In the step shown in FIG. 10, an appropriate underlayment 82 is installed over the wall sheathing 6, and an approximate object throughhole marking 83 is created on the underlayment 82. The approximate object throughhole marking 83 overlies the approximate outlet box marking 80 and is centered about the object throughhole 78.

Figure 11:
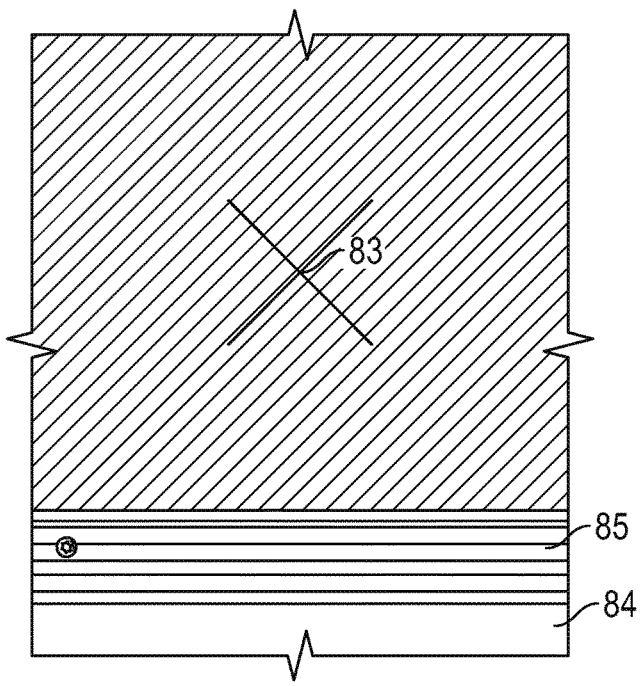
Figure 12:
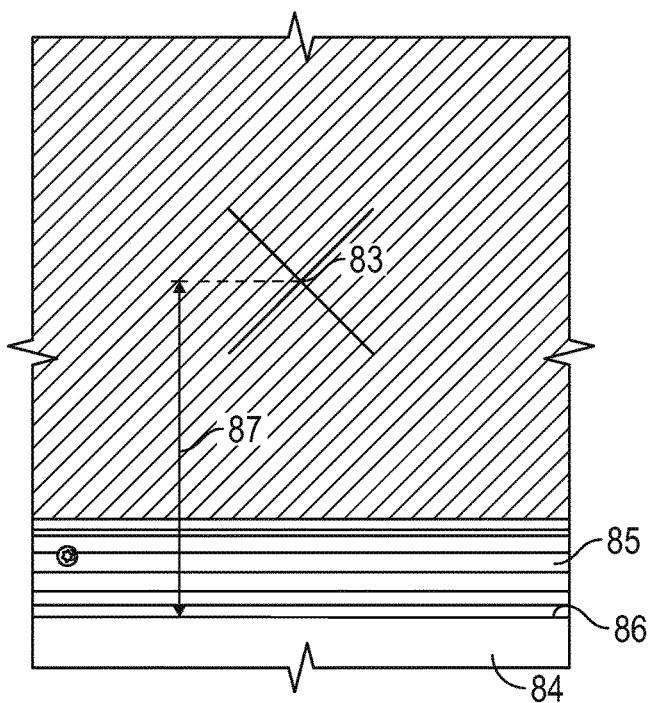

In the step shown in FIG. 11, the structural panels (e.g., metal wall panels or vinyl siding panels) are installed on the structure 4 until the next building panel will cover all or part of the approximate object throughhole marking 83. As shown in FIG. 11, a first building panel 84 comprising a panel lock 85 has been installed on the structure 4. In the step shown in FIG. 12, the user measures the distance 87 between a bottom edge 86 of the panel lock 85 of the first building panel 84 and the center of the approximate object throughhole marking 83.

Figure 13:
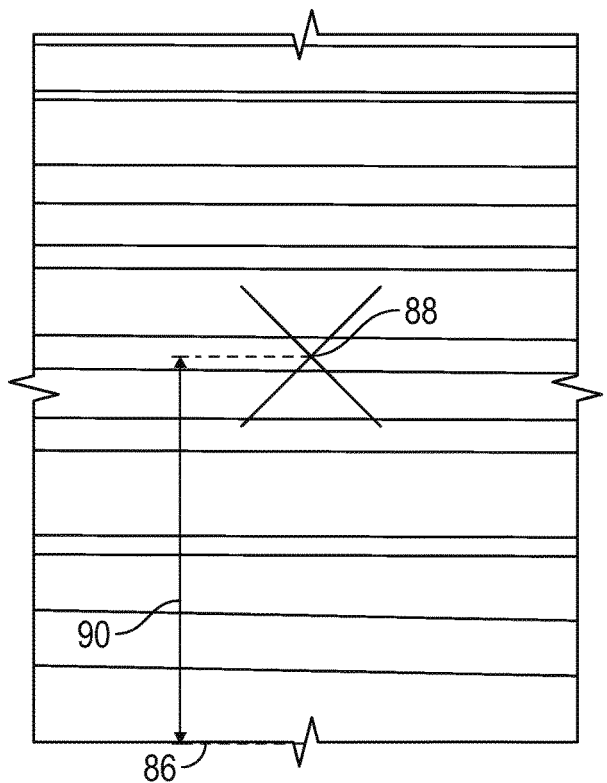

In the step shown in FIG. 13, a second building panel 89 is placed in position adjacent to the first building panel 84 and the user creates an approximate object throughhole marking 88 on the second building panel 89 at a position corresponding with a distance 90 measured from the bottom edge 86 of the panel lock 85 of the first building panel 84. The distance 90 is equal to the distance 87, and the approximate object throughhole marking 88 corresponds with the approximate location of the object throughhole 78. In the steps shown in FIGS. 14 and 15, the user places the box portion 20 atop the second building panel 89, approximately centers the approximate object throughhole marking 88 within the interior opening area 34, and then creates a rectangular marking 91 on the second building panel 89. The rectangular marking 91 has a length and width that approximately correspond with the maximum length and width of the exterior area 31 of the box portion 20.

Figure 16:
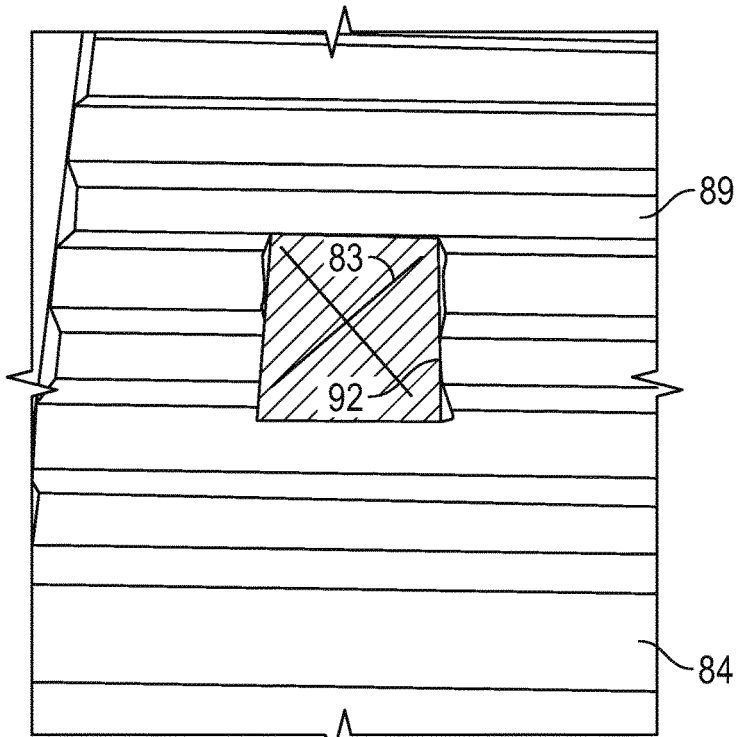

In the step shown in FIG. 16, the user cuts an outlet box hole 92 in the second building panel 89 that corresponds with the rectangular marking 91. The approximate object throughhole marking 83 should be visible within the outlet box hole 92 and approximately centered therein. At this point, the user may want to temporarily place the box portion 20 in the outlet box hole 92 to check for a proper fit. If the outlet box hole 92 is too small to fit the box portion 20 therein, the outlet box hole 92 may need to be increased in size. Once the outlet box hole 92 is properly dimensioned, the second building panel 89 is property installed on the structure 4.

Figure 17:
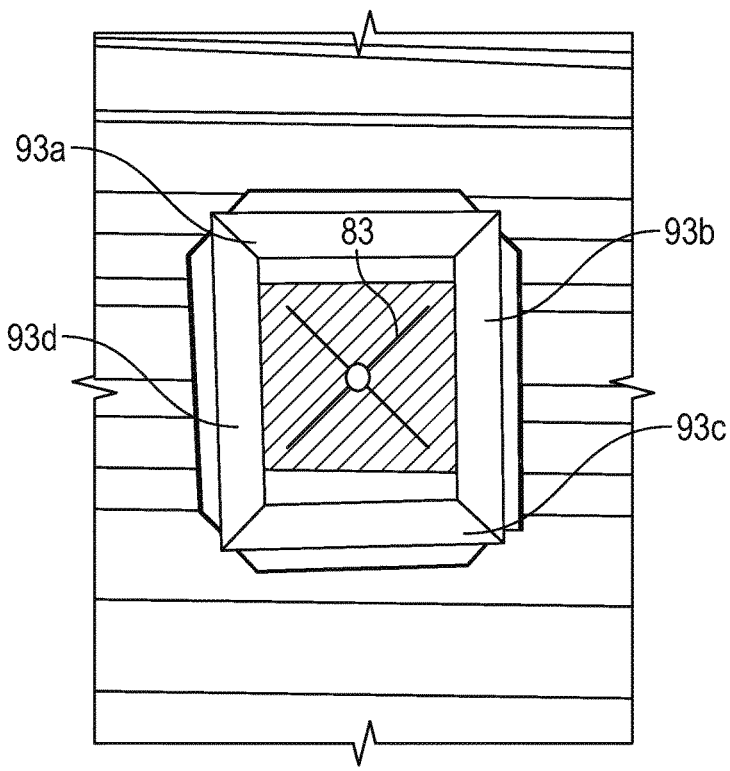
Figure 18:
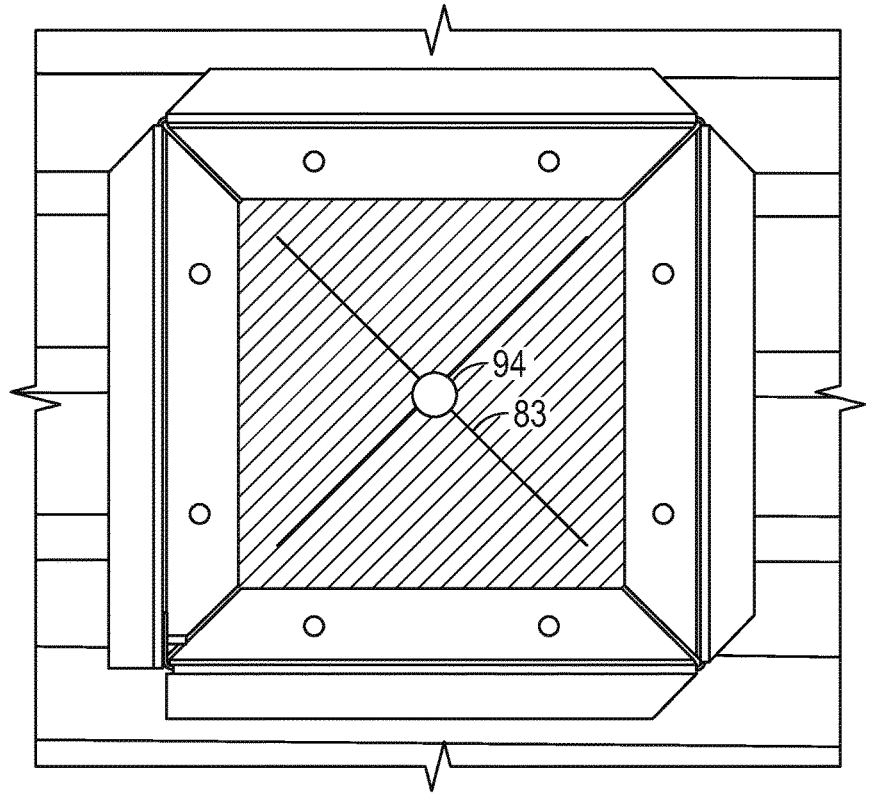

In the step shown in FIG. 17, adhesive weatherproof strips 93a-93d are installed onto the rear sides of respective interior flanges 40-43. In some embodiments, the adhesive weatherproof strips 93a-93d are comprised of butyl tape. In the step shown in FIG. 18, the box portion 20 is placed within the outlet box hole 92 and the adhesive weatherproof strips 93a-93d are pressed into contact with the underlayment 82. At this point, the user may punch a throughhole 94 through the underlayment 82 at the location of the approximate object throughhole marking 83.

Figure 19:
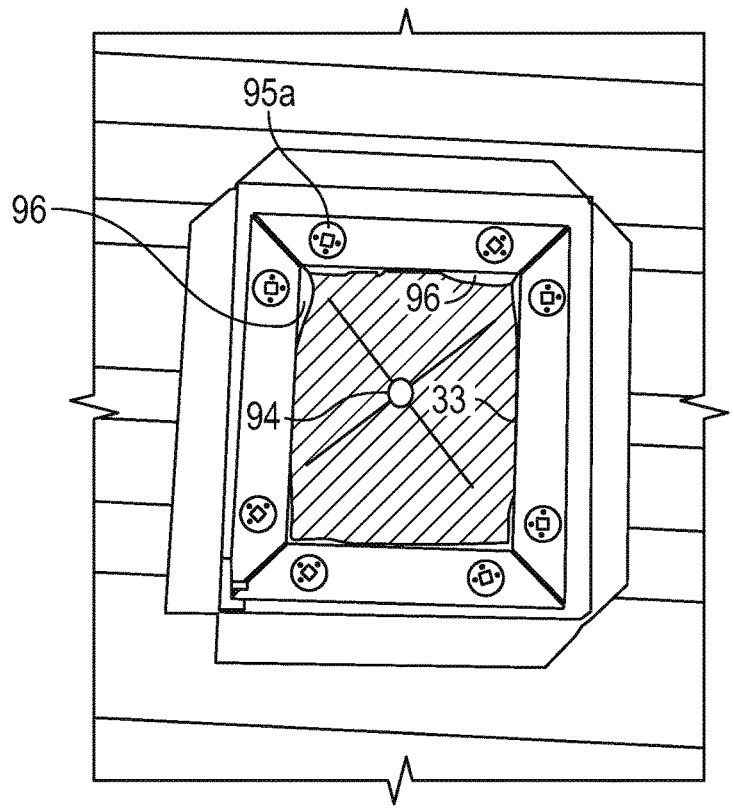

In the step shown in FIG. 19, a weatherproof sealant 96 is placed around each of the mounting holes (including mounting hole 44a) and the entire interior opening perimeter 33, and a plurality of fasteners (for convenience, only fastener 95a is labeled in the Figures) are routed through the mounting holes and into the structure 4, As the fasteners are tightened down, the sealant generates a nice seal around the fasteners and the interior opening 32. The adhesive weatherproof strips 93a-93d and weatherproof sealant 96 act to ensure that no water that enters the outlet box 10 will escape behind the building panels 84,89. In alternate embodiments, the weatherproof strips need not be adhesive, and could merely make a press fit against the underlayment 82.

Figure 20:
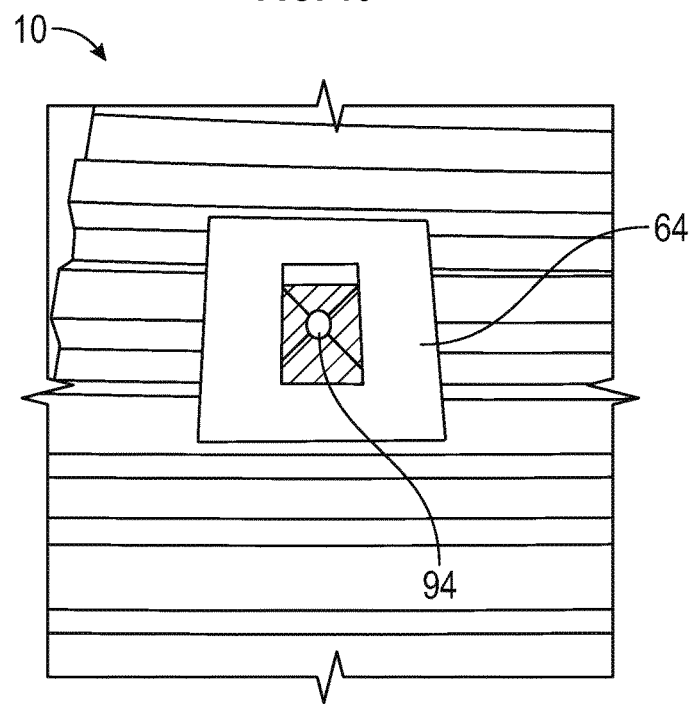
Figure 21:
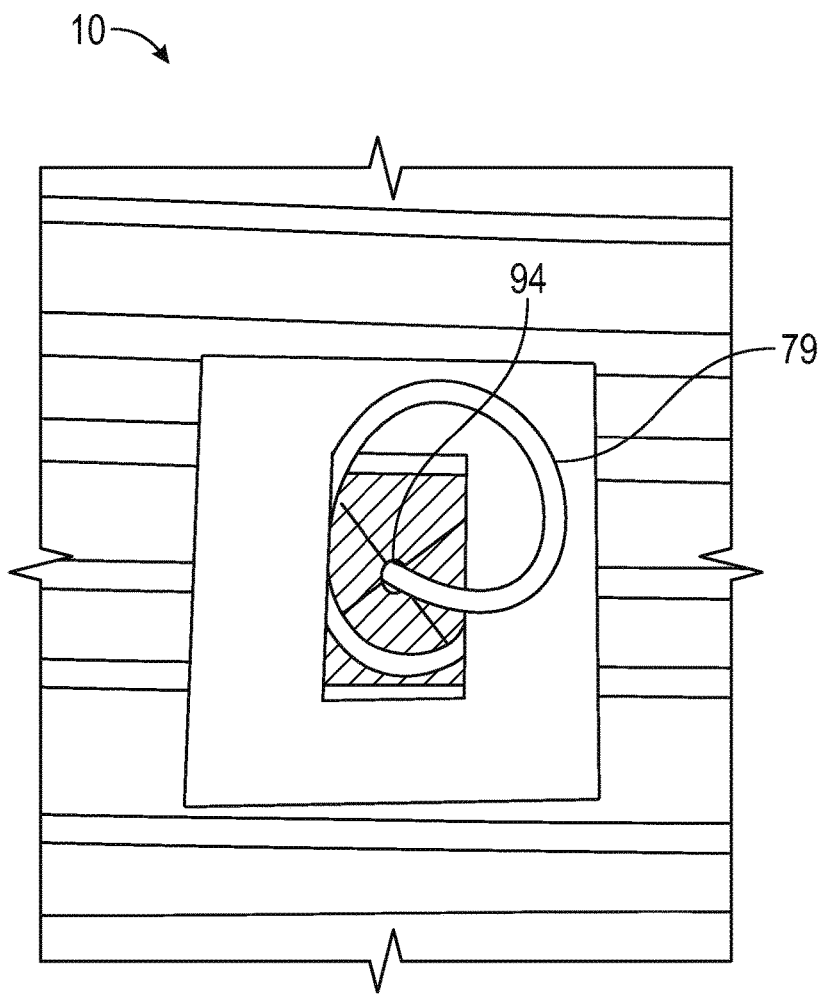

In the steps shown in FIGS. 20 and 21, the cover portion 64 is installed on the box portion 20 to form the completed outlet box 10, and the object 79 (in this embodiment, a wire) is pulled through the object throughhole 78, throughhole 94 in the underlayment 82, and into the outlet box 10. The object 79 is now ready to be used, for example via, wiring to an outlet.

An exemplary order of steps of the method according to the present invention has been set forth above. One of ordinary skill in the art would recognize that some of the steps could be reordered, combined, and/or omitted while keeping within the scope and spirit of the present invention.

Although exemplary implementations of the herein described device and method have been described in detail above, those skilled in the art will readily appreciate that many additional modifications are possible in the exemplary embodiment(s) without materially departing from the novel teachings and advantages of the herein described device and method. Accordingly, these and all such modifications are intended to be included within the scope of the herein described device and method. The herein described device and method may be better defined by the following exemplary claims.

Additional Aspects of the Invention

Additional aspects of the invention include:

Aspect 1: A receptacle outlet box comprising a body comprising: a plurality of rear flanges, a plurality of front flanges, and a plurality of side panels, the plurality of side panels defining a body front opening, each of the plurality of front flanges extending outwardly from one of the plurality of side panels, each of the plurality of rear flanges being co-planar to the other flanges of the plurality of rear flanges, each of the plurality of rear flanges being located in a first plane, each of the plurality of front flanges being located in a second plane, the first and second planes being substantially parallel, each of the plurality of side panels extending from the first plane to the second plane, the plurality of rear flanges having a plurality of fastener apertures formed therein; and a cover comprising a face portion and a plurality of cover flanges, the face portion having a front side having a cover front opening located therein, a rear side, and a plurality of outer edges, each of the plurality of cover flanges extending inwardly from one of the plurality of outer edges to form a gap between the rear side of the face portion and the respective one of the cover flanges, the plurality of cover flanges defining a cover rear opening; wherein the plurality of cover flanges of the cover and the plurality of front flanges of the body are shaped and configured so that at least some of the plurality of front flanges extend into at least some of the gaps in the cover when the cover is slid along the second plane into contact with the body.

Aspect 2: The receptacle outlet box according to Aspect 1, the body further comprising a body rear opening having a perimeter, wherein the plurality of rear flanges do not extend into the perimeter.

Aspect 3: The receptacle outlet box according to Aspect 1, the body further comprising a body rear opening having a perimeter, wherein at least one of the plurality of rear flanges extend into the perimeter.

Aspect 4: A receptacle outlet box that is attachable to a surface of a structure, the surface lying in a plane, the receptacle outlet box comprising: a box portion and a cover portion, the box portion comprising a rear side that is attachable to the surface, the rear side having a rear opening; and a front side opposing the rear side, the front side located away from the surface when the box portion is attached to the surface, the front side having a front opening, at least one flange extending away from the front opening, and a first stop member located on a bottom portion of the box portion; the cover portion comprising at least one slot and a second stop member located on a bottom portion of the cover portion, the cover portion being removably installable onto the box portion by inserting at least one of the at least one flange into at least one of the at least one slot and moving the cover portion in a direction toward the first stop member until the second stop member moves past the first stop member and a bottom edge of the first stop member and a top edge of the second stop member become coplanar; wherein when the receptacle outlet box is attached to the surface, the cover portion is removable from the box portion by moving the second stop member in a direction away from the structure until the first stop member and second stop member are no longer coplanar and moving the second stop member past the first stop member and away from the bottom portion of the box portion until the at least one flange disengages from the at least one slot.

Aspect 5: The receptacle outlet box according to Aspect 4, wherein the at least one flange is parallel to the plane and at least one of the first stop member and second stop member is not parallel to the plane when the receptacle outlet box is installed on the surface.

Aspect 6: The receptacle outlet box according to Aspect 5, wherein both the first stop member and the second stop member are not parallel to the plane when the receptacle outlet box is installed on the surface.

Aspect 7: The receptacle outlet box according to any of Aspects 4-6, wherein the rear side of the box portion comprises at least one mounting flange that extends into a perimeter of the rear opening.

Aspect 8: The receptacle outlet box according to Aspect 7, wherein the at least one mounting flange is adapted to receive a fastener for attaching the receptacle outlet box to the surface.

Aspect 9: The receptacle outlet box according to any of Aspects 4-8, wherein the rear side of the box portion comprises at least one mounting flange that extends away from the perimeter of the rear opening.

Aspect 10: The receptacle outlet box according to Aspect 9, wherein the at least one mounting flange is adapted to receive a fastener for attaching the receptacle outlet box to the surface.

Aspect 11: The receptacle outlet box according to any of Aspects 4-10, further comprising a plurality of panels that space the front side of the box portion away from the rear side of the box portion.

Aspect 12: The receptacle outlet box according to any of Aspects 4-11, the at least one flange comprising a top flange and a pair of side flanges, wherein when the receptacle outlet box is attached to the surface the top flange and pair of side flanges are coplanar and lie in a second plane that is parallel to the plane of the surface and the first stop member lies in a third plane that is not parallel to the plane of the surface.

Aspect 13: A method of installing a receptacle outlet box on a surface of a structure overlying a throughhole that extends between an interior and an exterior of the structure, the structure having at least one pre-installed building panel attached thereto, the receptacle outlet box having a box portion and a cover portion, the box portion having a front side and a rear side that is attachable to the surface, the rear side having a rear opening and at least one flange that extends interior to a perimeter of the rear opening, the front side having a front opening, at least one flange that extends away from a perimeter of the front opening, and a first stop member located on a bottom portion of the front side, the cover portion having at least one slot and a second stop member located on a bottom portion thereof, the method comprising: cutting a hole in the at least one building panel approximately overlying the throughhole in the structure and that approximates the perimeter of the rear side of the receptacle outlet box; inserting the receptacle outlet box into the hole so that the rear portion contacts the surface, at least a portion of the throughhole aligns with at least a portion of the rear opening of the rear side of the receptacle outlet box, and the at least one building panel is located between the at least one flange of the front side of the box portion and the surface of the structure; attaching the receptacle outlet box to the surface; and removably installing the cover portion to the box portion by engaging the at least one slot with the at least one flange of the box portion and moving the cover portion in a direction toward the first stop member until the second stop member moves past the first stop member and a bottom edge of the first stop member and a top edge of the second stop member become coplanar.

Aspect 14: The method according to Aspect 13, further comprising passing a wire from the interior of the structure through the throughhole and into the receptacle outlet box.

Aspect 15: The method according to either of Aspect 13 or Aspect 14, wherein the step of attaching the receptacle outlet box to the surface further comprises routing at least one fastener through the at least one flange of the rear side of the box portion and into the surface of the structure.

Aspect 16: The method according to any of Aspects 13-15, further comprising, prior to the step of inserting the receptacle outlet box into the hole, forming the receptacle outlet box from a blank by folding the blank into the configuration of the receptacle outlet box.

Aspect 17: The method according to any of Aspects 13-16, further comprising, prior to the step of removably installing the cover portion to the box portion, forming the cover portion from a blank by folding the blank into the configuration of the cover portion.

Aspect 18: The method according to any of Aspects 13-17, further comprising applying a weatherproof material to the rear side of the box portion of the receptacle outlet box prior to the step of attaching the receptacle box to the surface.

Aspect 19: The method according to any of Aspects 13-18, after the step of removably installing the cover portion to the box portion, removing the cover portion from the box portion by moving the second stop member in a direction away from the structure until the first stop member and second stop member are no longer coplanar and then moving the second stop member past the first stop member and away from the bottom portion of the box portion until the at least one flange disengages from the at least one slot.

Aspect 20: A method for installing a plurality of structural panels and a receptacle outlet box onto a building structure, the building structure comprising an underlayment already installed thereon, the method comprising: (a) identifying a location of a throughhole to be formed in the underlayment; (b) installing the plurality of structural panels to the building structure over the underlayment; (c) after performing step (b), cutting a body hole in one or more of the plurality of structural panels of sufficient size to enable a body of the receptacle outlet box to be attached to the building structure directly atop the underlayment, the throughhole being located at least partially within the body hole, the body of the receptacle outlet box having a plurality of rear flanges located in a first plane, a plurality of side panels, and a plurality of front flanges located in a second plane, the plurality of side panels extending from the first plane to the second plane, the plurality of rear flanges having a plurality of fastener apertures therein; (d) fastening the body of the receptacle outlet box to the building structure through the underlayment using a plurality of fasteners that are passed through the plurality of fastener apertures; and (e) attaching a cover to the body by sliding the cover along the second plane to engage at least some of the plurality of front flanges of the body until a front opening in the cover overlaps the throughhole.

What is claimed is:
1. A receptacle outlet box comprising:
a body comprising a plurality of rear flanges, a plurality of front flanges, and a plurality of side panels, the plurality of side panels defining a body front opening, each of the plurality of front flanges extending outwardly from one of the plurality of side panels and in a direction away from a center of the body, each of the plurality of rear flanges being co-planar to the other flanges of the plurality of rear flanges, each of the plurality of rear flanges extending inwardly from one of the plurality of side panels and in a direction of the center of the body, each of the plurality of rear flanges being located in a first plane, each of the plurality of front flanges being located in a second plane, the first and second planes being substantially parallel, each of the plurality of side panels extending from the first plane to the second plane, the plurality of rear flanges having a plurality of fastener apertures formed therein; and a cover comprising a face portion and a plurality of cover flanges, the face portion having a front side having a cover front opening located therein, a rear side, and a plurality of outer edges, each of the plurality of cover flanges extending inwardly from one of the plurality of outer edges to form a gap between the rear side of the face portion and the respective one of the cover flanges, the plurality of cover flanges defining a cover rear opening;

wherein the plurality of cover flanges of the cover and the plurality of front flanges of the body are shaped and configured so that at least some of the plurality of front flanges extend into at least some of the gaps in the cover when the cover is slid along the second plane into contact with the body.

2. The receptacle outlet box of claim 1, the body further comprising a body rear opening having a perimeter, wherein the plurality of rear flanges do not extend into the perimeter.

3. The receptacle outlet box of claim 1, the body further comprising a body rear opening having a perimeter, wherein at least one of the plurality of rear flanges extend into the perimeter.

4. A receptacle outlet box that is attachable to a surface of a structure, the surface lying in a plane, the receptacle outlet box comprising:

a box portion and a cover portion, the box portion comprising
 a rear side that is attachable to the surface, the rear side having a rear opening; and
 a front side opposing the rear side, the front side located away from the surface when the box portion is attached to the surface, the front side having a front opening, at least one flange extending away from the front opening, and a first stop member comprising a bottom flange extending from a bottom portion of the box portion;

and the cover portion comprising
 a front face,
 a rear face,
 at least one slot, and
 a second stop member comprising a bottom flange extending from a bottom portion of the cover portion, the bottom flange being integrally connected to the bottom portion of the cover portion and including a distal end, an inside surface, and an outside surface, the bottom flange being bent toward the rear face of the cover portion such that the inside surface of the bottom flange abuts the rear face of the cover portion,
 the cover portion being removably installable onto the box portion by inserting at least one of the at least one flange into at least one of the at least one slot and moving the cover portion in a direction toward the first stop member until the second stop member moves past the first stop member and a bottom edge of the first stop member and the distal end of the second stop member become coplanar;

wherein when the receptacle outlet box is attached to the surface, the cover portion is removable from the box portion by moving the second stop member in a direction away from the structure until the first stop member and second stop member are no longer coplanar and moving the second stop member past the first stop member and away from the bottom portion of the box portion until the at least one flange disengages from the at least one slot.

5. The receptacle outlet box of claim 4, wherein the at least one flange is parallel to the plane and at least one of the first stop member and second stop member is not parallel to the plane when the receptacle outlet box is installed on the surface.

6. The receptacle outlet box of claim 5, wherein both the first stop member and the second stop member are not parallel to the plane when the receptacle outlet box is installed on the surface.

7. The receptacle outlet box of claim 4, wherein the rear side of the box portion comprises at least one mounting flange that extends into a perimeter of the rear opening.

8. The receptacle outlet box of claim 7, wherein the at least one mounting flange is adapted to receive a fastener for attaching the receptacle outlet box to the surface.

9. The receptacle outlet box of claim 4, wherein the rear side of the box portion comprises at least one mounting flange that extends away from the perimeter of the rear opening.

10. The receptacle outlet box of claim 9, wherein the at least one mounting flange is adapted to receive a fastener for attaching the receptacle outlet box to the surface.

11. The receptacle outlet box of claim 4, further comprising a plurality of panels that space the front side of the box portion away from the rear side of the box portion.

12. The receptacle outlet box of claim 4, the at least one flange comprising a top flange and a pair of side flanges, wherein when the receptacle outlet box is attached to the surface the top flange and pair of side flanges are coplanar and lie in a second plane that is parallel to the plane of the surface and the first stop member lies in a third plane that is not parallel to the plane of the surface.

13. A receptacle outlet box comprising:

a body comprising a plurality of rear flanges, a plurality of front flanges, and a plurality of side panels, the plurality of side panels defining a body front opening having a front opening perimeter and a body rear opening having a rear opening perimeter, each of the plurality of rear flanges extending inwardly from the rear opening perimeter and in a direction toward a center of the body, the plurality of rear flanges having a plurality of fastener apertures formed therein; and a cover comprising a face portion and a plurality of cover flanges which correspond to the plurality of front flanges, wherein the cover and the body are operationally configured to enable the cover to be removably secured to the body with the face portion of the cover proximal to the body front opening and extending outwardly beyond the front opening perimeter along each of the plurality of side panels; and wherein at least one cover flange of the plurality of cover flanges is bent to create at least one slot between the at least one cover flange and the face portion, the at least one slot being sized and shaped to receive a corresponding one of the plurality of front flanges.

14. The receptacle outlet box of claim 13, wherein at least one cover flange of the plurality of cover flanges is bent such that it is flattened against the face portion of the cover.

15. The receptacle outlet box of claim 14, wherein the at least one cover flange is configured to engage with a corresponding one of the plurality of front flanges to inhibit movement of the cover relative to the body in one direction.

16. The receptacle outlet box of claim 15, wherein the at least one cover flange is configured to be coplanar with the corresponding one of the plurality of front flanges when the cover is secured to the body.

17. The receptacle outlet box of claim 13, wherein the plurality of front flanges includes a top front flange, a bottom front flange, and a pair of side front flanges.

18. The receptacle outlet box of claim 17, wherein the plurality of cover flanges includes a top cover flange, a bottom cover flange, and pair of side cover flanges, the top and pair of side cover flanges being sized and shaped to interface with the top and pair of side front flanges, respectively, when the cover is secured to the body.

\* \* \* \* \*